United States Patent Office 3,130,061
Patented Apr. 21, 1964

3,130,061
INORGANIC COATING COMPOSITION
Walter M. McMahon, La Habra Heights, and Charles G. Abba, Bell, Calif., assignors to American Pipe and Construction Co., South Gate, Calif., a corporation of Delaware
No Drawing. Filed Feb. 6, 1961, Ser. No. 87,112
16 Claims. (Cl. 106—84)

This invention relates to inorganic, water-insoluble, coating compositions adapted by self-curing for the protection of metal surfaces, especially ferrous metal surfaces, and more particularly to self-curing coating compositions composed of lithium hydroxide and colloidal silica in critical proportions as a binder and metal-protecting metal pigment such as zinc dust, powdered lead or flake aluminum to provide anti-corrosion protection for the metal surface.

Coating compositions of the invention comprise lithium hydroxide and colloidal silica binder in proportions of lithium hydroxide expressed as lithium oxide to silica in a molar ratio of about 1:40 as a minimum up to a molar ratio of 1:2.5 as a maximum.

These limited amounts of lithium hydroxide and colloidal silica which make up the binder of the invention provide in the presence of metal pigment, highly desirable coating compositions of the invention which when compared with compositions in which the lithium hydroxide ingredient is absent are superior in significant respects and provide improved adhesion to the metal substrate, superior working qualities with solid pigment and other components in the composition, and permit very much thinner uniform coatings to be applied to completely cover metal surfaces to be protected (down to about 3 mils thickness as dry film). Surprisingly, the compositions of the invention exhibit improved film flexibility in such thin coatings while providing improved hardness and improved self-curing characteristics which is apparently based upon chemical interaction of the lithium hydroxide component with the finely divided metal pigment and silica present as essential ingredients in the coating composition.

The achievement of these superior coating characteristics mentioned in the preceding paragraph is based upon adjustment of the proportions of binder components, lithium hydroxide and colloidal silica within the above stated molar proportions.

If the amount of lithium hydroxide component is reduced to such a level as to provide a mol ratio of $Li_2O/SiO_2$ which is less than about 1:40, for example in the range of about 1:100 molar ratio, the physical and chemical properties of enhanced adhesion, improved flexibility, better working characteristics and enhanced self-curing characteristics are not obtained. Indeed, the resulting coating compositions containing lithium hydroxide below the minimum value are comparble with those in which lithium hydroxide is absent.

Coating compositions containing colloidal silica binder which is substantially free from the effective minimum amount of lithium hydroxide as used in the invention may be satisfactory in certain respects, but these silica binder compositions do not exhibit the improved physical and chemical properties and advantages of the lithium hydroxide containing coatings of the invention, particularly the self-curing characteristic. It appears that a synergistic improvement of properties is due to the presence of lithium hydroxide which interacts in a new manner with finely divided metal pigment to provide self-curing properties and outstanding resistance of the wholly inorganic coating.

If the amount of lithium hydroxide binder in the metal pigment containing composition of the invention is more than will provide a mol ratio in respect to colloidal silica of 1:2.5, for example if a mol ratio value of $Li_2O/SiO_2$ of about 1:2 is used, then the chemical interaction of lithium hydroxide with colloidal silica tends to make the composition unstable under the conditions of alkalinity existing in the liquid aqueous inorganic coating composition, there is a tendency toward the formation of lithium disilicate which is a relatively insoluble compound. Accordingly, precipitation and gelling of the liquid coating composition occurs on standing and thereby makes the composition unsatisfactory for commercial application. At a mole ratio $Li_2O/SiO_2$ of 1:1, which is reached when still more lithium hydroxide is added, the alkalinity increases and lithium metasilicate is formed. Lithium metasilicate, like lithium disilicate tends to precipitate so that the presence of both of these silicates is unsatisfactory in the coating composition, resulting in poor working qualities and in practice, preventing uniform coating application.

Within the specified upper and lower limits of mol ratio $Li_2O/SiO_2$ from 1:40 up to 1:2.5 in accordance with the invention, preferred coating compositions can be formulated within these limits for specific metal pigments to provide outstanding properties of film adhesion, hardness, film flexibility, self-curing properties and working characteristics. In formulating the binder of the invention with finely divided zinc, the molar ratio of $Li_2O/SiO_2$ lies within the more limited range of molar ratio 1:20 up to 1:3.

Lithium silicate in colloidal form although unsuitable per se as a binder due to its low solubility in neutral aqueous solution as above mentioned, nevertheless hydrolyzes slowly to form lithium hydroxide and silica. By suitable adjustment of alkalinity in the form of NaOH for example, lithium silicate is obtained from the source of lithium hydroxide and alkalized-stabilized colloidal silica in a form usable as the binder of the coating composition of the invention.

The invention, therefore, includes methods of prepation of lithium oxide and colloidal silica binders in the proportions mentioned above for use with metal pigments by adding small amounts of lithium hydroxide to a colloidal silica sol in the presence of alkali, preferably sodium hydroxide or potassium hydroxide, which serves as stabilizer for the lithium oxide and silica components and provides a colloidal mixture of binder ingredients functioning in combination with the finely divided metal protective pigment for improved anti-corrosion coating.

In one method of the invention there are mixed aqueous lithium hydroxide solution and colloidal silica sol in water at about 20–50% solids in the presence of alkali metal hydroxide stabilizer such as sodium hydroxide or potassium hydroxide to form the alkaline aqueous, inorganic binder, the amounts of each of the binder ingredients adjusted within the stated critical molar ratios ($Li_2O/SiO_2$ 1:40 to to 1:2.5) and the finely divided metal pigment is well mixed with the aqueous alkaline inorganic coating vehicle.

Another method of the invention comprises starting from aqueous colloidal lithium silicate solution in which the mol ratio of $Li_2O/SiO_2$ lies at about at least 1:2.5 and adjusting the mol ratio of $Li_2O/SiO_2$ if needed by adding alkali stabilized (sodium hydroxide or potassium hydroxide used as stabilizer) colloidal silica thereby providing the binder in more stable colloidal form, this binder being mixed with metal pigment as stated in the previous paragraph.

The protective metal pigments used in the invention such as zinc dust, powdered lead or aluminum flake are preferably less than 15 microns in particle size. Improved flexibility of the resulting coating may be realized by employing a mixture of a major proportion (60–90% by weight) of finely divided metal pigment of a fine particle size, for example zinc of uniform particle size of 4–6 microns, with a minor proportion (40–10%) metal pigment of relatively coarser particle size, e.g., about 10–14 microns. The foregoing mixture of metal pigments of different screen size is adapted for thin as well as thicker films, e.g., up to 2–4 mils in thickness on the metal base. For very thin coatings, e.g., about 0.5–1.0 mil in film thickness, there may be used a 50/50 mixture by weight of very fine particles of metal, such as zinc, in the range of 1–3 microns and relatively coarser particles of zinc in the range of 8–12 microns.

If there is used substantial amounts of particles of metal above 20 micron size, more than 20–25% by weight, then there is a tendency for the film to crack on drying.

If the particle size range of the protective metal such as zinc lies within a very narrow range, e.g., 95%+2–3 microns, the films which are produced are not completely satisfactory in every respect for flexibility, adhesion and curing power. Hence, it is desirable that substantial proportions of particles of metal pigment be in the larger size ranges, e.g., 6–12 microns and the remaining particles be in the smaller size ranges, e.g., 1–4 microns.

The proportion of finely divided metal pigment of preferred screen size which is employed with the lithium hydroxide-colloidal silica binder of the invention may vary from about 1:1 weight ratio up to about 25:1 weight ratio on a dry weight basis of metal pigment to binder, depending upon the specific gravity of the pigment, and also upon the hydrophilic or hydrophobic surface characteristics of the metal binder. Using zinc dust, which is a medium specific gravity pigment and which is preferred for many applications to provide corrosion protection for the underlying metal structure, especially ferrous metals, there are used from about 8 to about 20 parts of finely divided zinc metal to binder on a dry weight basis as preferred proportions. With more than about 20 parts of zinc dust the zinc dust appears at the surface of the film, causing a dusty film. This dusty film is less flexible, more porous and less adherent than films containing less than 20 parts of metal per part of binder. At less than about 8 parts of zinc per part of binder, there is a tendency to spotting, e.g., the formation of light areas in the film, indicating an insufficient metal pigment for properly covering and protecting the underlying metal.

On the other hand, lead dust which is a heavier pigment than zinc dust may be used in a higher weight ratio of binder, the ratio being up to 25 to 1 by weight. Aluminum flake, aluminum dust, magnesium dust or magnesium flake, which are all examples of much lighter metals than zinc or lead may be used in proportions to binder (dry weight basis) as low as 1:2. In fact, aluminum or magnesium in flake form have such excellent covering power in comparison to zinc bases upon their leafing characteristics that the preferred upper limit of dry weight ratio metal pigment to binder is about 1:3. In most cases using aluminum or magnesium dust proportions lying between 1:1 and 1:2 on a weight basis are preferred for most coating uses.

Finely divided insoluble inorganic compounds as further additives may be desirably incorporated with the metal pigment to serve as pigments, as extenders and as auxiliary anti-corrosion agents. The inorganic extender compounds include red lead, lead dioxide, lead chromate, zinc oxide, zinc chromate, iron oxide and aluminum oxide.

The pigments include iron oxide, titanium dioxide, lithopone, zinc sulfide, asbestine, carbon black, ultramarine blue, Hansa yellow, sienna, burnt umber, china clay, blanc fixe, chromium oxide, and chrome yellow among the commonly available pigments.

Flexibilizing extenders such as mica, bentonite and exfoliated vermiculite may also be added.

The foregoing metal compound extenders and pigments used in the coating composition generally possess a specific gravity which is lower than that of zinc metal pigments and these extenders are usually used on a dry weight ratio relative to binder of about 2:1 to 5:1, the heavier pigments being employed at the higher end of the range.

An advantage of the lithium hydroxide-colloidal silica binder of the invention lies in the greater compatibility of this binder for diverse inorganic pigments such as listed above which pigments inherently vary in their acidity or alkalinity from acid to alkaline pH. With other binders, these pigments frequently cannot be used because they are reactive. Yet with the binder of the invention all but the most acid pigments can be used without substantially interfering with the desired cathodic protection which is provided by the metal protecting pigment. Rather wide ranges of inert filler may be added. However, it is preferred to use up to about 15% of inert filler by weight of metal pigment. This amount does not degrade the essential corrosion inhibiting characteristics of the coating and contributes to desired economy of ingredients for formulation.

The formulation of the coating composition containing the essential lithium hydroxide-colloidal silica film forming binder and metal pigment may be varied widely to achieve any desired color. Even if lesser amounts of metal pigment are used, auxiliary metal compound as extender and anti-corrosion additive can be added to reduce the cost. The addition of cheaper pigments and extenders permits economies with certain colors at the same time, making no sacrifice in the self-curing characteristics based upon the binder containing metal pigment and the excellent physical and chemical properties of the film.

In the above stated proportions of metal protective pigment or mixture of metal pigment with aforesaid metal compound for each part of the colloidal binder there is achieved film toughness, good film flexibility, high film hardness and complete film continuity even in a very light single or priming coating which rapidly self-cures to a water-insoluble condition in the film.

Hardness of the lithium hydroxide-silica and metal pigment film may be enhanced in certain cases by suitable selection of suitable hard pigment and hard extender as fillers. Non-uniformity in film hardness, which is observed with alkali metal silicate binder, is not encountered with the coating composition of the invention.

An outstanding and unique characteristic of the lithium hydroxide-colloidal silica binder of the invention is its quick self-curing characteristic to a state of water-insolubility in the presence of finely divided metal pigment. This characteristic makes unnecessary the addition of curing agents or after treatment of the coating with additional curing agents; in the absence of curing agents and for ordinary outdoor use, the present binder-metal composition can be applied to give a single finish coating, pigmented as desired, with excellent common resisting characteristics for underlying metal. This single coating exhibits good abrasion resistance, excellent resistance to all conditions of climate and weather, excellent resistance to salt water and salt spray to be eminently suitable for exposure to the elements at marine installations or for protection in chemical plants wherein only mild chemicals come into contact with the coating. Completely cured thin films (0.3–3 mils) as well as thick films (6–20 mils) are readily obtained.

In the form of metal pigmented inorganic paint, the film-forming binder becomes insoluble and resistant to water in a matter of minutes after application to a metal base; this initial self-curing reaction taking place in a matter of minutes. The self-curing action continues for at least several hours after the initial stage and proceeds up to several months in some cases. The chemistry of the curing reaction is not well understood, but it is believed that the insolubilization of the film takes place in two rather distinct stages:

(1) A stage of evaporation to eliminate the aqueous vehicle which proceeds rapidly.
(2) A stage of chemical reaction of lithium hydroxide colloidal silica binder with the metal protecting pigment which proceeds slowly.

It is noted that lithium salts of weak acids, such as silicic acid are much more insoluble than are the corresponding silicates of sodium and potassium or other metals in the alkali metal group. Thus a first difference based upon lithium hydroxide being present in comparison to these other alkali silicates is the relatively more rapid physical drying of the film in the first stage of curing. The film, in the first stage becomes more water-insoluble initially due to ordinary room temperature dehydration than the corresponding water glass binder paint. Carbon dioxide present in the air at room temperature contributes to this rapid insolubilization of the coating of the invention by reducing the alkalinity of the coating, this alkalinity in the aqueous paint being due to the alkali metal hydroxide used as stabilizer.

In the second stage of chemical reaction by insolubilization, the inorganic binder and pigment ingredients in the film react slowly and continue to react slowly over a period of as long as several months to form a complex inter-linked, insoluble film. The lithium silicate ingredient and the metal pigment such as zinc combine with carbonates and silicates, which are present in the chemically insolubilized film.

In the case of lead being present as the metal pigment, lead reacts with the lithium hydroxide and colloidal silica ingredients and appears to be present in the complex in the form of an added insoluble lead oxide or complex salt with silica. That the chemical reaction occurs is indicated not only by the fact that the film becomes much harder, tougher and more adherent with time, but also by the fact that the film gradually changes in color after drying, the color changes continuing over long time periods.

PROPORTIONS OF LITHIUM HYDROXIDE TO COLLOIDAL SILICA IN THE COATING COMPOSITION

Table I below illustrates critical factors in lithium hydroxide-colloidal silica proportions.

Highly favorable film binding and working properties are obtained with binder having a molecular ratio of lithium oxide to silica of at least about 1:40 and up to 1:2.5. In the presence of zinc the upper limit is preferably 1:3.5. In the presence of aluminum the upper limit preferably 1:5.0. The coating shown in Table I below based on samples 3-9 were outstanding on steel. At lithium oxide-silica ratios of 1:3 to 1:5 unusual hardness flexibility and toughness are achieved and excellent corrosion protection is observed, especially for ferrous metal. At these ratios, the film self-cures even in thin coatings and results in an extremely desirable chemically and physically resistant coating. These characteristics are had throughout the range of 1:3 to 1:5 as shown in Table I.

LITHIUM HYROXIDE-COLLOIDAL SILICA BINDER FORMULATIONS; EFFECT OF $Li_2O/SiO_2$ MOLAR RATIO

Table I

| Solutions | 1 | 2 | 3 | 4 | 5 | 6 | 7 | 8 | 9 |
|---|---|---|---|---|---|---|---|---|---|
| Colloidal Silica Solids | 30 | 30 | 30 | 30 | 30 | 30 | 33 | 30 | 30 |
| Water | 102 | 102 | 102 | 102 | 102 | 102 | 102 | 102 | 102 |
| Lithium Hydroxide | | 2 | 4 | 6 | 8 | 9 | 10 | 12 | 14 |
| Molar Ratio $Li_2O:SiO_2$ | zero | 1:20.8 | 1:10.4 | 1:7 | 1:5.2 | 1:4.6 | 1:4.2 | 1:3.5 | 1:3 |
| | Increasing ratio of $Li_2O$ $\longrightarrow$ | | | | | | | | |

In the above table, sample 1 is the control. Samples 2-9 were all superior to the control for making water resistant self-curing films.

Samples 2 and 3 do not harden as rapidly on air drying as samples 4-9. However, sample 2 represented a distinct improvement in quality of film over the control sample, sample 1.

For each lithium hydroxide-silica ratio there is a maximum quantity of metal pigment such as red lead or zinc dust which can be bound. With lower concentrations of the lithium alkali this amount of zinc is not always sufficient to prevent pinpoint corrosion and these variations are demonstrated in Tables II and III below.

Outstanding rates of hardening were noted for ratios of 1:4.6 and higher.

Table II

| Mixture | 1 | 2 | 3 | 4 | 5 | 6 | 7 | 8 | 9 |
|---|---|---|---|---|---|---|---|---|---|
| $SiO_2$ | 30 | 30 | 30 | 30 | 30 | 30 | 30 | 30 | 30 |
| Water | 102 | 102 | 102 | 102 | 102 | 102 | 102 | 102 | 102 |
| $LiOH\ H_2O$ | | 2 | 4 | 6 | 8 | 9 | 10 | 12 | 14 |
| Zinc Dust (Median Particle size 8 microns) | 450 | 450 | 450 | 450 | 450 | 450 | 450 | 450 | 450 |

By critical examination of the films, it was determined that the initial hardness of the films goes up with increasing alkali content while the porosity drops. Although these films are all substantially insoluble after 24-48 hours and will withstand immersion in neutral aqueous solutions, water tends to diffuse along the surfaces at rates governed by the continuity of the coating.

EFFECT OF METAL PIGMENT IN MINIMUM AMOUNT IN ALKALI STABILIZED LITHIUM HYDROXIDE-COLLOIDAL SILICA FORMULATION

For each lithium hydroxide-silica ratio there is a maximum quantity of metal pigment which can be bound such as for example, red lead or zinc dust. With lower concentrations of lithium hydroxide, the amount of zinc may not always be sufficient to prevent pinpoint corrosion and spotting. Thus, the amount of lithium hydroxide as well as the amount of metal pigment are interrelated.

Best results in eliminating the spots and pinpoint corrosion occur when the ratio of lithium hydroxide monohydrate to silica is 1:3 or higher ($Li_2O:SiO_2=1:4.2$). At these levels of lithium silicate binder the minimum amount of zinc dust which is needed to eliminate pinpoints of corrosion is 450 parts in 100 parts of aqueous binder. The maximum amount of zinc which can be satisfactorily bound is about 800 parts, and this is demonstrated in Table III below:

*Table III*

| $SiO_2$ | $H_2O$ | Lithium Hydroxide Monohydrate | Zinc Dust | Results |
|---|---|---|---|---|
| 30 | 100 | 10.0 | 450 | No corrosion; good binding. |
| 30 | 136 | 10.0 | 1,000 | No corrosion; poor binding of pigment. |

The typical colloidal silica which is used for making the lithium hydroxide-colloidal silica binder in the above Table III, is an alkali stabilized colloidal silica. This alkali stablized colloidal silica sol does not resemble other common inorganic colloidal dispersions. A desirable property of this colloidal silica is that the silica is irreversibly precipitated on drying. Once the colloidal silica is dispersed, in water for example, and dried, it becomes irreversible and cannot be redispersed.

Generally, the alkali-stabilized colloidal silica is in the form of dispersed particles having a particle size of 1 to 100 millimicrons and having the alkali as sodium hydroxide or potassium hydroxide substantially all outside of the silica particles.

The colloidal silica used in the foregoing and following examples of the tables is composed of 29 to 31% $SiO_2$, about 2.5 to about 0.3% $Na_2O$ or $K_2O$ and a maximum of 0.15% sulfates as $Na_2SO_4$, and is obtainable commercially in the form of a water slurry containing about 30% solids. The alkali stabilizer may be present in amounts up to about 4% as $Na_2O$ or $K_2O$. The silica particles in colloidal silica are extremely small, ranging from about 0.01 to 0.03 micron in maximum dimension.

The colloidal silica used herein is described in detail in U.S. Patent Nos. 2,244,325, issued June 3, 1941; 2,574,902, issued November 13, 1951, and 2,597,872, issued May 27, 1952, and may be prepared by passing alkali metal silicate through an ion exchange resin to remove the alkali as described in U.S. Patent No. 2,244,325. If all of the alkali is removed from the silicate, the resulting sols are not stable, but they can be stabilized by adding a small amount of alkali such as $Na_2O$ or $K_2O$.

The silica-alkali ratio varies in commercially available colloidal silica from about 60:1 to about 130:1, the dispersion containing discrete silica particles, having a molecular weight, as determined by light scattering of more than one-half million. It has a relative viscosity, at 10% $SiO_2$, from 1.15 to 1.55 and generally contains from 20 to 35% by weight of $SiO_2$.

The alkali present in colloidal silica is not uniformly distributed throughout the $SiO_2$ particles as it is in conventional silicate such as water glass but is substantially all outside the $SiO_2$ particles and acts as a stabilizer for the $SiO_2$ sol to prevent condensation of the $SiO_2$ particles.

A number of types of alkali stabilized colloidal silica which may be used are listed as follows:

| Trade Name | Solids | pH |
|---|---|---|
| Ludox HS | 30.0 | 9.8 |
| Ludox LS | 30.0 | 8.4 |
| Syton C-30 | 30.0 | 9.8 |
| Syton C-15 | 15.0 | 9.8 |
| Nalcoag 1015 | 15.0 | 8.6 |
| Nalcoag 1030 | 30.0 | 10.2 |
| Nalcoag 1035 | 35.0 | 8.6 |
| Nalcoag 1050 | 50.0 | 9.0 |

To colloidal commercial silica sol listed above, a solution of lithium hydroxide is added and these components react to form a soft gel which breaks down to a slightly cloudy solution after agitation and heating. The change in character of the colloidal silica component is seen by casting thin films on glass plates and comparing them with films from colloidal silica sols and low alkaline silicate solutions respectively. As the lithium hydroxide content increases from a control of no addition, the precipitated particles in dried films go from discontinuous curled platelets (no alkali) to a continuous cohesive film (high alkali). The intermediate concentrations produce films with properties lying between the two extremes.

If the lithium hydroxide content is too low, the colloidal nature of the silica will be exaggerated. This is probably due to the lithium hydroxide diffusing from the silica, leaving the latter in a more rigid state where shrinkage forces exceed cohesive forces. Small amounts of alkali in the form of NaOH or KOH may be added to stabilize the lithium hydroxide colloidal silica in amounts expressed as $Na_2O$ or $K_2O$ up to about 4% by weight of the water present.

ZINC PIGMENTED FORMULATIONS FOR ANTI-CORROSION COATINGS

The following Table IV indicates proportions of preferred in situ formulations of colloidal silica, lithium hydroxide and zinc dust which make satisfactory self-curing films in accordance with the invention.

*Table IV*

| Weight Silica | Weight Water | Weight Lithium Hydroxide Monohydrate | $Li_2O/SiO_2$, Mol Ratio | Weight Zinc Dust |
|---|---|---|---|---|
| 30 | 30–70 | | 1:21 | 200–300. |
| 30 | 20–70 | 2.0 | 1:21 | 200–300. |
| 30 | 30–70 | 4.0 | 1:10.5 | 300–400. |
| 30 | 70–90 | 6.0 | 1:7.0 | 400–500. |
| 30 | 70–100 | 8.0 | 1:5.25 | 450–800. |
| 30 | 70–135 | 9.0 | 1:4.66 | 450–800. |
| 30 | 70–135 | 10.0 | 1:4.2 | 450–800. |
| 30 | 70–135 | 12.0 | 1:3.5 | 450–800 (optimum properties). |
| 30 | 86–100 | .88+8.71 NaOH | 14.03 (1=.121 LiOH—$H_2O$ +.879 NaOH). | 450–800 (typical mixed silicate formula). |

The formulae below the line in Table IV hardened much more rapidly than those above the line.

The formulations summarized in foregoing Table IV utilize zinc dust having the following particle size distribution:

| | Percent |
|---|---|
| 1–2.0 microns | 5–10 |
| 2–4.0 microns | 10–15 |
| 4–6.0 microns | 15–20 |
| 6–8.0 microns | 15–25 |
| 8–10 microns | 10–30 |
| 10–12 microns | 20 |
| Over 12 | 5 |

The particle size distribution of the zinc dust is such as to substantially eliminate large particles above 20 microns in size since large particles present in substantial proportion more than 10%, causes cracking of the film on drying.

In the formulation shown in the above table, when the mol ratio of lithium oxide to silica goes beyond 1:3.5, the mixture of binder and zinc will not harden rapidly enough on air drying to meet the strict requirements for self-curing rapid hardening anti-corrosion coatings.

Graphite may be incorporated into the paint at a concentration of 1% by weight of the zinc dust which is present without degrading, in any material respect, the film properties which are achieved. Its inclusion appears to enhance the conductivity of the zinc-filled coating. Red lead can be used to replace up to about 16% of the zinc with substantially no significant loss of cathodic protection which is afforded by the finely divided zinc metal. One advantage of adding red lead is its inhibition of hydrogen gas formation and another advantage is the factor of lower filler cost.

Inert fillers such as mica and barytes can also be substituted in part for the zinc, but must be used in limited proportions since excessive amounts tend to detract from the anodic properties of the zinc protective agent. In amounts up to 15% of the zinc the filler can be used to decrease tendency toward cracking when the zinc dust does not contain enough large particles in the 3–12 micron range and the inert fillers also provide lower raw material cost.

The fillers which by testing show the best advantages are very fine mica, known as grade C-1000 mica and coarse barytes.

In the foregoing Table IV, the compositions have been illustrated with zinc dust, with mixtures of zinc and red lead, mixtures of zinc and graphite, mixtures of zinc and mica, and mixtures of zinc and barytes.

Following is a description of aluminum lithium silicate composition which were tested in Florida marine atmosphere and found to be very satisfactory. Examination of the film after one week's exposure showed that it was insoluble and reasonably hard. A faint white efflorescence was noted by close inspection of the surface, but it could not be seen at a distance beyond several feet. This coating composition provided outstanding protection for the exteriors of storage tanks, particularly in coastal locations where the tanks were exposed to salt air from the nearby ocean.

ALUMINUM PIGMENT FORMULATION FOR OUTDOOR EXPOSURE

| Weight Colloidal Silica (dry basis) | Weight Water | Weight Lithium Hydroxide Monohydrate | $Li_2O/SiO_2$, Mol Ratio | Weight Aluminum Powder |
| --- | --- | --- | --- | --- |
| 30 | 134 | 8.97 | 1:4.67 | 26 |

The aluminum powder used here is Metals Disintegrating Company's MD 5100 which is defined in Fed. Spec. TT–A–468, Type I, Class B, and in A.S.T.M. D962–49, Type I, Class B.

DECORATIVE PIGMENTS IN LITHIUM HYDROXIDE-COLLOIDAL SILICA COATINGS

The invention includes pigmented lithium hydroxide-colloidal silica paints free from protective metal pigment and pigmented with bright inorganic pigments as illustrated in Table V below.

Highly useful lithium hydroxide-colloidal silica paints pigmented with common decorative pigments can be made in accordance with the typical formulations set out in Table V below. Because the usual pigments are of uniform and ultrafine particle size, relatively coarse filler may be added to avoid cracking of the film.

*Table V*

| Color | Pigment | Weight $SiO_2$ | Weight Water | Weight Lithium Hydroxide Monohydrate | $Li_2O/SiO_2$, Mole Ratio | Wt. Pig. | Wt. C-1000 Mica |
| --- | --- | --- | --- | --- | --- | --- | --- |
| Green | (Chromic Oxide green pigment) | 30 | 190 | 8.97 | 1:4.67 | 175 | 35 |
| Red | (Oxide Red Mapico 297) | 30 | 190 | 8.97 | 1:4.67 | 175 | 35 |
| White | (Titanox A–WD) | 30 | 234 | 8.97 | 1:4.67 | 40 | 42 |
|  | Zinc Oxide (Horsehead XX–503 grade) |  |  |  |  | 46 |  |
|  | Zinc Oxide (Kadox 15 grade) |  |  |  |  | 11 |  |

In the foregoing Tables I–V and other examples, the metal protecting pigment is exemplified with zinc dust and with aluminum flake. There may also be used powdered lead having a particle size varying from about 1 micron to about 15 microns, preferably an average size of about 8–10 microns, the proportion of powdered lead to binder varying from about 20 to about 40 parts per part of colloidal lithium silicate.

When lead is used, as in the case with zinc pigment such finely divided pigment and extender compounds as lead oxide, lead dioxide, lead chromate, zinc oxide, iron oxide and aluminum oxide may be added in amounts up to 15% of the lead to replace part of the lead. Here the benefit of additional protection or inhibition against hydrogen gas formation is supplied in the paint containing the compounds of lead, e.g., lead oxide, red lead, etc. By appropriate selection of a particle size range of the finely divided extender, the blending of the metal pigment with the binder may be improved. To illustrate, either zinc or aluminum dust having a particle size range of from 2–8 microns can be blended with inert extender such as mica, titanium dioxide, zinc oxide, chromic oxide, alumina, barytes, iron oxide, etc. in a coarser particle range of from about 6–40 microns. Since the extender has a substantial fraction of coarser particles above 12 microns in diameter, it helps distribute the finer metal particles. The coarser extender may be used to advantage with finer particle size protective metal pigment to enhance the covering characteristics and flexibility of the metal pigment.

Since the binder, metal pigment, auxiliary anti-corrosion metal oxide, flexibilizers such as mica or barytes and extender of the present coating are each wholly inorganic, the film is unaffected by organic solvents or by liquid water after the film is cured. Thus, the film is also wholly unaffected by ultraviolet light, by changes in humidity, by neutral inorganic salts, by water vapor and by organic solvents. It is accordingly, very useful in providing resistance against organic chemicals such as petroleum hydrocarbons, toluol, ether, xylol, ketones, chlorinated hydrocarbons, etc.

If softening of the film occurs in a freshly applied coating due to contact or immersion in water, this softening characteristic quickly disappears after the coating has been completely cured by standing.

By using water resistant filler, the softening can be diminished. However, it is desirable that the coatings first be set in a substantially completely water-resistant state.

If conditions of humidity or moisture are such that the normal self-curing action of the present coating composition is not rapid enough to suit the requirements which are to be met, or if water sensitive filler is employed which delays self-curing beyond that which can be tolerated, acid salts or dilute mineral or organic acids may be used in aqueous solution as curing agents which appear to accelerate the self-curing mechanism of the binder of the invention. Illustrative examples of such acids are dilute (e.g., 5–20%) solutions of sulfuric acid, hydrochloric acid, acetic acid, phosphoric acid, nitric acid or acid salts of strong mineral acids such as sodium bisulfate, sodium dihydrogen phosphate. However, it is observed that for most cases, the use of this type of acid solution for hardening the coating through immersion, spraying, painting or the like is not necessary and weathering in time produces the full benefits of hardness, infusibility, abrasion resistance and resistance to the elements or to chemical solvents.

Indeed, the self-curing characteristic of the binder of the invention which results from initial quick setting by evaporation and more gradual setting by chemical interaction without the need for curing agents represents a main advantage of the binder in the coating of the invention.

The fact that the highly anti-corrosive protection is provided in but a single coating acting as the finished coating and having very valuable properties of abrasion resistance, hardness, chemical resistance, weathering resistance in this single continuously covered finish coating, even in thin films, provides an important commercial advantage leading to commercial preference for the coating of the invention as compared to other inorganic coatings which are commercially available.

We claim:

1. An inorganic protective coating composition for metal surfaces which is self-curing at room temperature consisting essentially of water as a dispersing medium and a film-forming binder consisting of lithium hydroxide and alkali stabilized colloidal silica having a particle size of about 1 to about 100 millimicrons, the molar ratio of lithium hydroxide expressed as lithium oxide to colloidal silica, on a dry weight basis, being about 1:40 up to about 1:2.5 and from about 1 part up to about 25 parts of a finely divided metal pigment per part of said binder, said pigment being reactive with said binder and selected from the group consisting of zinc dust, powdered lead and aluminum flake, there being present from about 0.3% to about 4% by weight of alkali as $Na_2O$ and $K_2O$ in said stabilized colloidal silica, the proportion by weight of said reactive pigment to said film-forming binder being at least 1:1 for the lightest density reactive pigment and varying up to a maximum of about 25:1.

2. An inorganic protective coating composition for a metal surface consisting essentially of a film-forming binder consisting of lithium hydroxide and alkali stabilized colloidal silica having a particle size of about 1 to about 100 millimicrons, the molar ratio of lithium hydroxide expressed as lithium oxide to colloidal silica, on a dry weight basis, being about 1:40 up to about 1:2.5 and at least about 1 part of a finely divided metal pigment per part of said binder, said pigment being less than 15 microns in size and being reactive with said binder and selected from the group consisting of zinc dust, powdered lead and aluminum flake, the proportion by weight of said reactive pigment to said film-forming binder being at least about 1:1 for the lightest density reactive pigment and varying up to 25:1 for heavier density reactive pigment.

3. A coating composition as claimed in claim 1 incorporating a decorative pigment consisting of an oxide selected from the group consisting of chromic oxide, iron oxide, zinc oxide and lead oxide.

4. A coating composition as claimed in claim 2 wherein said reactive metal pigment is zinc.

5. A coating composition as claimed in claim 2 wherein said reactive metal pigment is aluminum.

6. A coating composition as claimed in claim 2 wherein said reactive metal pigment is lead.

7. A coating composition as claimed in claim 2 wherein said molar ratio of lithium oxide to silica is from 1:40 to 1:3 and said reactive metal is zinc.

8. A coating composition as claimed in claim 2 wherein there is present an extender in an amount up to 15% of said reactive metal pigment.

9. A coating composition as claimed in claim 2 wherein there is also present a finely divided coloring pigment having a coarser particle size than said metal pigment in the range of from 6 microns to 40 microns particle size.

10. A decorative coating composition as claimed in claim 9 wherein the molar ratio of $Li_2O$ to $SiO_2$ is about 1 to 4.67 and in which mica is also present.

11. A coating composition as claimed in claim 9 wherein carbon black is the coloring pigment which is present.

12. A coating composition as claimed in claim 9 wherein said coarser coloring pigment includes barytes.

13. A coating composition as claimed in claim 9 wherein graphite is the coloring pigment which is present.

14. A coating composition as claimed in claim 9 wherein coloring pigment is titanium dioxide.

15. A composition as claimed in claim 9 including a clay as an extender.

16. A method of making an aqueous inorganic, self-curing coating composition adapted to protect metal surfaces against corrosion consisting essentially of adding lithium hydroxide solution to alkali stabilized colloidal silica of a particle size of about 1 to about 100 millimicrons, said colloidal silica being stabilized with from about 0.3 to about 4.0% of alkali metal hydroxide selected from the group consisting of sodium hydroxide and potassium hydroxide, these expressed as $Na_2O$ and $K_2O$, respectively, by weight of the water present in the mixture, adjusting the molar ratio of lithium hydroxide expressed as $Li_2O$ to colloidal silica to a value lying between about 1:40 up to 1:2.5, and mixing to form a self-curing binder and adding a reactive metal pigment to said self-curing binder whereby initial hardening of the binder at room temperature occurs mainly by evaporation on drying and said hardening continues after drying at room temperature by interaction of the binder ingredients and said reactive metal, said reactive pigment being selected from the group consisting of zinc dust, powdered lead and aluminum flake, the proportion by weight of said reactive pigment to said film-forming binder being at least 1:1 for the lightest density reactive pigments and extending up to a maximum of about 25:1.

References Cited in the file of this patent

UNITED STATES PATENTS

| | | |
|---|---|---|
| 2,440,969 | Nightingall et al. | May 4, 1948 |
| 2,576,845 | McDonald | Nov. 27, 1951 |
| 2,765,237 | Drummond | Oct. 2, 1956 |
| 2,978,361 | Seidl | Apr. 4, 1961 |
| 2,998,328 | Munger | Aug. 29, 1961 |

OTHER REFERENCES

Iler: "Colloid Chemistry of Silica and Silicates" (1955), Cornell University Press, Ithaca, N.Y. (page 111).

Iler: "Colloid Chemistry of Silica and Silicates," pub., 1955, by Cornell University Press, Ithaca, N.Y. (pages 41, 45, 48).